United States Patent [19]

Nakagami

[11] Patent Number: 5,108,181

[45] Date of Patent: Apr. 28, 1992

[54] FIBER OPTIC GYRO WITH SELF-DIAGNOSTIC FUNCTION

[75] Inventor: Kouichi Nakagami, Tokyo, Japan

[73] Assignee: Japan Aviation Electronics Industry Ltd., Tokyo, Japan

[21] Appl. No.: 716,280

[22] Filed: Jun. 17, 1991

[30] Foreign Application Priority Data

Jun. 21, 1990 [JP] Japan ................................ 2-163162

[51] Int. Cl.$^5$ .............................................. G01C 19/64
[52] U.S. Cl. .................................................... 356/350
[58] Field of Search ........................................ 356/350

[56] References Cited

U.S. PATENT DOCUMENTS 4,998,822  3/1991  Steele .................................. 356/350

Primary Examiner—Vincent P. McGraw
Attorney, Agent, or Firm—Pollock, Vande Sande & Priddy

[57] ABSTRACT

In a fiber optic gyro which is constituted by a negative feedback loop in which the phase difference between right-handed light and left-handed light propagating through an optical fiber coil is detected from their interference light and a ramp wave of a frequency corresponding to the detected phase difference is generated by a ramp generated and is applied to a feedback phase modulator to reduce the phase difference between the right-handed light and the left-handed light, a diagnostic signal generated by a diagnostic signal generator is applied via a combining circuit to the closed loop and the corresponding response signal is extracted therefrom. Based on the response signal, a diagnostic unit diagnoses a fault of the fiber optic gyro.

7 Claims, 7 Drawing Sheets

FIBER OPTIC GYRO WITH SELF-DIAGNOSTIC FUNCTION

BACKGROUND OF THE INVENTION

The present invention relates to a closed loop type fiber optic gyro and, more particularly, to a fiber optic gyro which permits a fault diagnosis to be made.

FIG. 1 shows a conventional closed loop type fiber optic gyro. A light source 12 is driven by a light source driver 11 to emit light. The light thus emitted from the light source 11 is provided via an optical coupler 13 to an optical splitter/coupler 15 which serves as interference means in an optical integrated circuit 14, and the light is incident therefrom, as right-handed and left-handed light, to both ends of an optical fiber coil 16 serving as an optical path which makes at least one loop. The right-handed light and the left-handed light emitted from the optical fiber coil 16 after propagation therethrough are combined by the optical splitter/coupler 15 and interfere with each other. The resulting interference light is provided via the optical coupler 13 to a photodetector 17 used as photoelectric conversion means for conversion into an electric signal corresponding to the intensity of the interference light. A bias phase modulator 18 is connected in series between the optical splitter/coupler 15 and one end of the optical fiber coil 16. A square-wave bias phase modulating signal from a bias phase modulator driver 19 is applied to the bias phase modulator 18 to drive it, by which the right-handed light and the left-handed light passing therethrough are both subjected to a $+\pi/4$ rad. phase shift and a $-\pi/4$ rad. phase shift alternately every propagation time $\tau$ of light through the optical fiber coil 16. The output of the photodetector 17 is synchronously detected by a synchronous detector 21 in synchronization with the phase shift.

When an angular rate having its center at the center of the optical fiber coil 16 is not being input thereinto, no phase difference exists between the right-handed light and the left-handed light both having propagated through the optical fiber coil 16. Upon input of the above-mentioned angular rate into the optical fiber coil 16, however, the following phase difference $\phi_R$ is introduced by the Sagnac effect between the right-handed light and the left-handed light, $$\phi_R = \frac{4\pi RL}{\lambda c} \Omega$$

where R is the radius of the optical fiber coil 16, L is the length of the optical fiber coil 16, $\lambda$ is the wavelength of the light from the light source 12, C is the velocity of light in a vacuum and $\Omega$ is the input angular rate. When the input angular rate $\Omega$ is zero, the output of the synchronous detector 21 is also zero, but when the input angular rate $\Omega$ develops, the synchronous detector 21 yields a DC output corresponding to the input angular rate $\Omega$. The DC output is integrated by an integrator 22, whose output is applied to a ramp generator 23 to drive it. That is, the ramp generator 23 repeatedly generates a voltage which linearly varies to a predetermined value at a slope corresponding to the magnitude of the integrated output. By this ramp output the right-handed light and the left-handed light are phase modulated to cancel the phase difference $\phi_R$ in a feedback phase modulator 24 connected in series between the optical splitter/coupler 15 and one end of the optical fiber coil 16 and serving as phase difference generating means. As a result of this, the frequency of the output ramp voltage from the ramp generator 23 becomes proportional to the input angular rate $\Omega$ as follows:

$$f = \frac{2R}{\lambda n} \Omega$$

where n is the refractive index of the optical fiber coil 16.

When the angular rate of forward rotation is provided to the optical fiber coil 16, the ramp generator 23 generates positive-going ramp waves and applies them to an output circuit 25, which, in turn, outputs a positive pulse for each ramp wave. When the angular rate of backward rotation is provided to the optical fiber coil 16, the ramp generator 23 applies negative-going ramp waves to the output circuit 25, which outputs a negative pulse for each ramp wave.

The conventional closed loop type fiber optic gyro described above has no self-diagnositc feature; therefore, once it is built in an apparatus, it is impossible to know whether the fiber optic gyro is normal, unless a check is made of the output of the apparatus after physically providing thereto an input angular rate or the fiber optic gyro produces an abnormal output owing to its failure.

SUMMARY OF THE INVENTION

It is therefore an object of the present invention to provide a closed loop type fiber optic gyro which has a self-diagnostic function for producing an output signal which indicates whether the fiber optic gyro is normal or not, without involving the necessity of physically providing thereto an input angular rate even after the gyro is incorporated in an apparatus.

In the closed loop type fiber optic gyro according to the present invention a diagnostic signal from diagnostic signal generating means is applied by signal coupling means to a closed loop, the resulting response signal is led out therefrom and a fault diagnosis is made by diagnotic means, based on the response signal.

DESCRIPTION OF THE PREFERRED EMBODIMENTS

Figure 1:
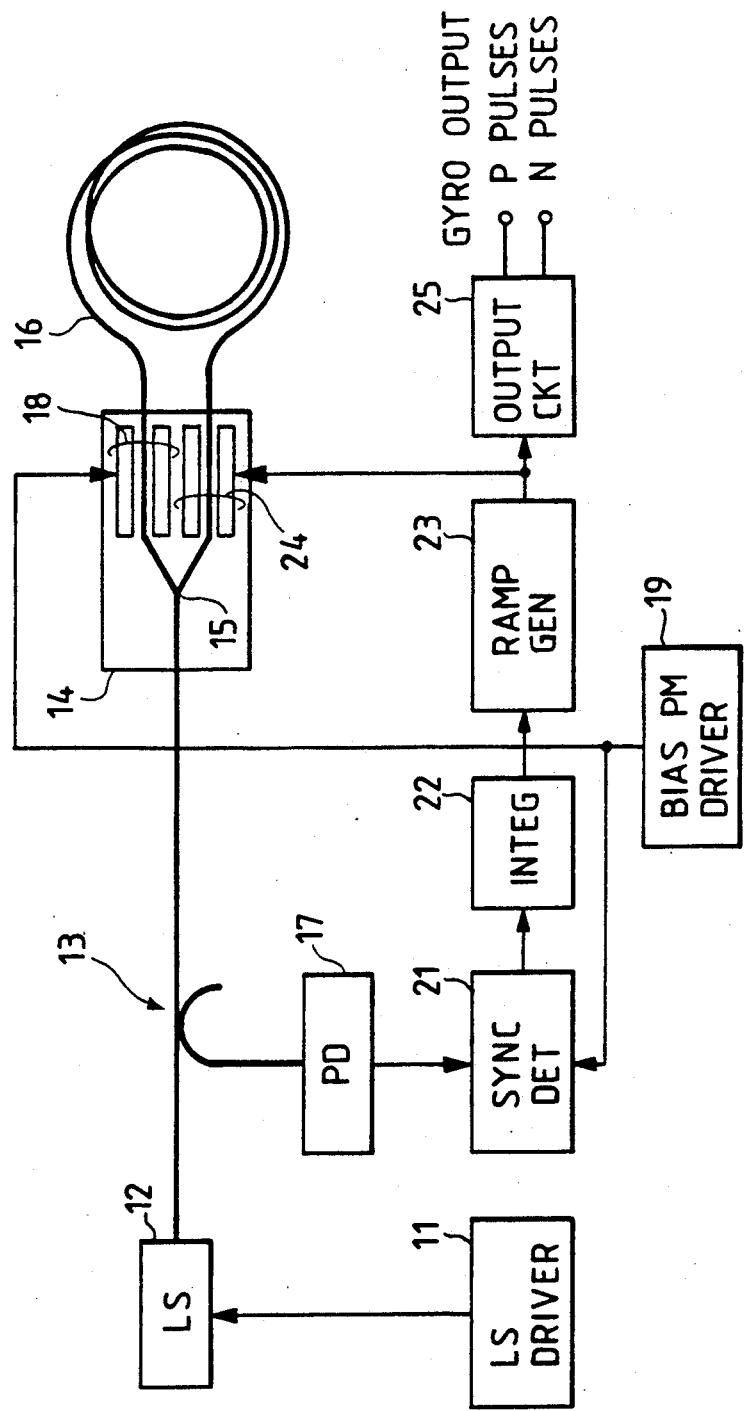
FIG. 1 is a block diagram showing a conventional fiber optic gyro.
Figure 2:
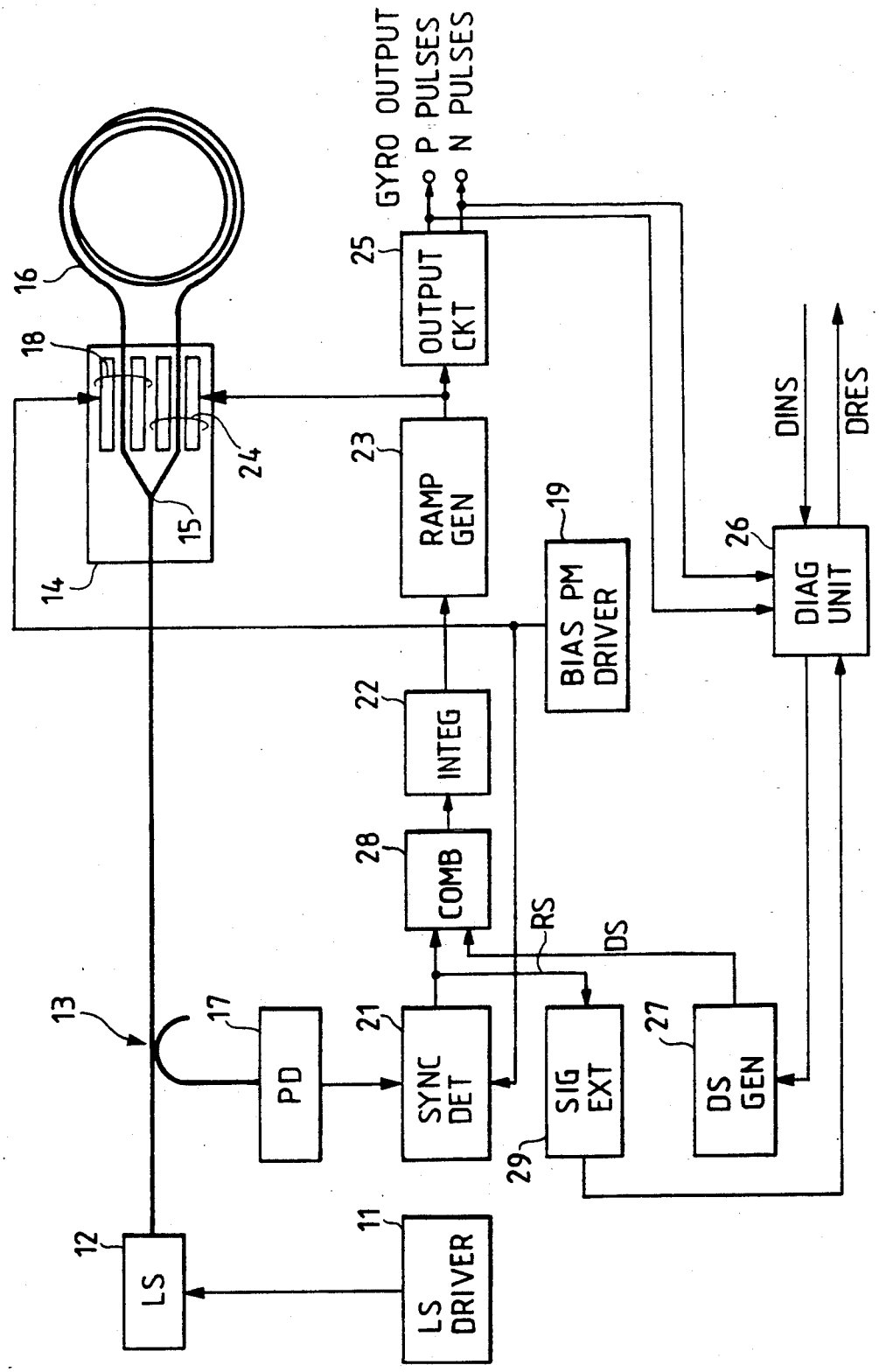
FIG. 2 is a block diagram illustrating a first embodiment of the present invention.

FIG. 2 illustrates in block form a first embodiment of the fiber optic gyro of the present invention, in which the parts corresponding to those in FIG. 1 are identified by the same reference numerals. In this embodiment a diagnostic unit 26 is provided, which responds to a diagnostic instruction DINS to cause a diagnostic signal generator 27 to generate a diagnostic signal DS. The diagnostic signal DS is applied to a combiner 28, wherein it is superimposed on the output of the synchronous detector 21, and the combined output is provided to the integrator 22. The output RS of the synchronous detector 21 is branched by a signal extractor 29 to the diagnostic unit 26.

Figure 3:
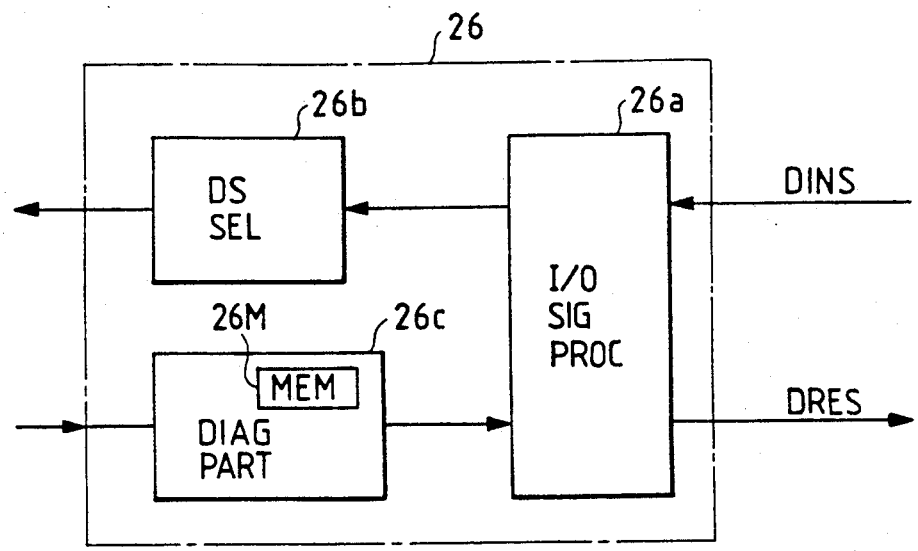
FIG. 3 is a block diagram showing an example of the function of a diagnostic unit 26 for use in the first embodiment.

The diagnostic unit 26 is formed by a microcomputer, for example. FIG. 3 shows its function. When an external diagnostic instruction DINS is received in an I/O signal processing part 26a, a diagnostic signal selecting part 26b is started, from which pieces of data specifying any one of DC diagnostic signals of a plurality of predetermined levels are output in digital form in a sequential order and a pieces of data specifying any one of AC diagnostic signals of pluralities of levels and frequencies are also output in digital form in a sequential order. The signal input from the signal extractor 29 is checked by a diagnostic decision part 26c as to whether it has a predetermined level relative to the corresponding diagnostic signal DS and as to whether its delay behind the diagnostic signal DS is within a given limit, and when the signal DS is an AC signal, the follow-up property of the input signal and the sameness of its waveform with respect to the signal DS are also checked. Based on the results of such checking, the diagnostic decision part 26c decides whether the operation of the fiber optic gyro is normal and outputs the result of the decision as a diagnostic result DRES via the I/O signal processing part 26a for display on a display unit (not shown).

Where the diagnostic unit 26 is such a program processing unit, the diagnostic signal generator 27 is constituted by a D/A converter. The signal extractor 29 extracts the output RS of the synchronous detector 21 by a buffer circuit of a high input impedance so as not to affect the loop of the fiber optic gyro and converts the extracted signal by an A/D converter into a digital signal for input into the diagnostic unit 26.

With such an arrangement, in the case where the diagnostic instruction DINS is provided to the diagnostic unit 26 when the input angular rate is zero, the diagnostic signal DS from the diagnostic signal generator 27 is superimposed on the output of the synchronous detector 21, by which is provided the same state as if an angular rate corresponding to the diagnostic signal DS is input. Accordingly, the ramp generator 23 generates a ramp-like feedback phase modulating signal such as will cancel the phase difference based on the angular rate corresponding to the diagnostic signal DS. The feedback phase modulator 24 is driven by the feedback modulating signal to phase shift the right-handed light and the left-handed light, introducing a phase difference between the right-handed light and the left-handed light which are output from the optical fiber coil 16. The output RS corresponding to the phase difference is provided from the synchronous detector 21. Where the fiber optic gyro is normal, the amplitude of the response signal RS which is extracted from the closed loop system is in proportion to the level of the diagnostic signal DS applied thereto, and if the frequency of the applied signal DS is increased, then the phase of the response signal RS changes but the response delay time remains unchanged.

Figure 4:
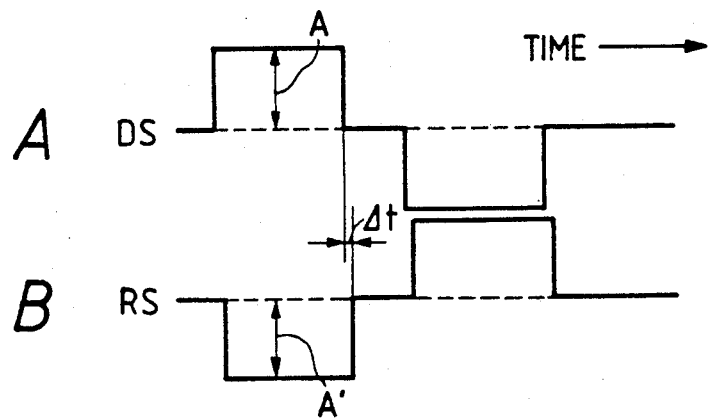
FIG. 4 is a waveform diagram showing examples of a DC diagnostic signal and a response signal corresponding thereto.
Figure 5:
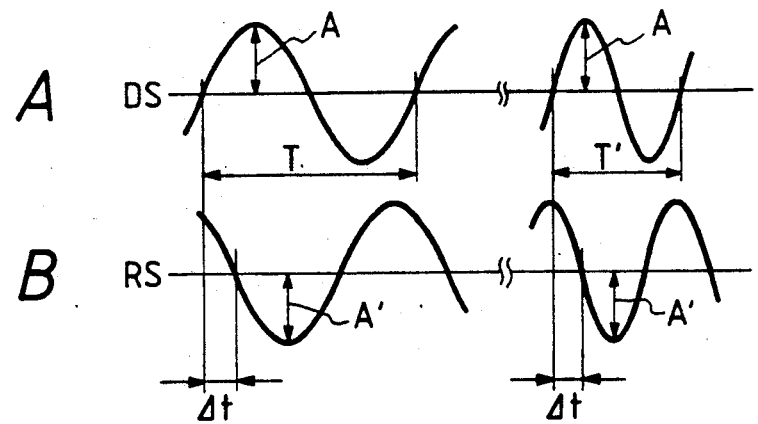
FIG. 5 is a waveform diagram showing examples of an AC diagnostic signal and a response signal corresponding thereto.

For example, when a DC diagnostic signal DS is applied to the integrator 22 as shown on Row A in FIG. 4, if the fiber optic gyro is normal, such a response output RS as if cancels the DC diagnostic signal DS is provided from the synchronous detector 21 after a time $\Delta t$ as depicted on Row B in FIG. 4. Similarly, when an AC diagnostic signal DS corresponding to the state of the varying input angular rate is applied to the integrator 22 as shown on Row A in FIG. 5, an AC response output RS which is opposite in polarity to the diagnostic signal DS is obtained after the time $\Delta t$ as shown on Row B in FIG. 5. In the case where the fiber optic gyro is at fault and hence does not operate normally, however, the level or waveform of the output signal RS differs from that of the diagnostic signal DS or the delay time $\Delta t$ exceeds a predetermined value. Based on the results of comparison between the diagnostic signal DS and the output signal RS of the synchronous detector 21, the diagnostic unit 26 decides whether the fiber optic gyro is normal or not and outputs the diagnostic result DRES.

For example, when the diagnostic signal DS is a DC signal, letting the level of the signal DS and the level of the response signal RS be represented by A and A', respectively, and assuming that when the fiber optic gyro is normal, the level ratio A'/A is within the following limit:

$$L_2 \leqq A'/A \leqq L_1,$$

it is possible to make such diagnoses as mentioned below.

(a) When A'/A<L, that is, when the level of the response signal RS is lower than AL, there are possibilities of (1) degradation of the light source 12, (2) misalignment of the light source 12 and (3) inaccurate connection of the optical integrated circuit 14 and the optical fiber coil 16.

(b) When A'/A=0, that is, when the response signal A' is not produced, there are possibilities of (1) a failure of the light source 12, (2) a failure of the optical integrated circuit 14 and (3) breakage of the optical fiber coil 16 or disconnection between the optical integrated circuit 14 and the optical fiber coil 16.

(c) When $L_1$<A'/A, that is, when the level A' of the response signal RS is higher than the level of the diagnostic signal DS, there is the possibility of the light source driver 11 being abnormal.

Figure 6A:
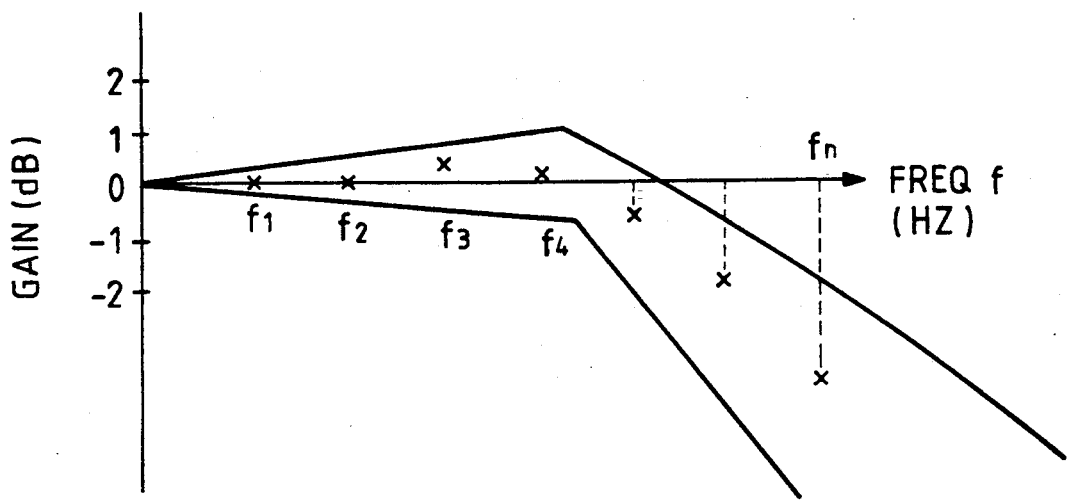
FIG. 6A is a graph showing the tolerance of an amplitude ratio.
Figure 6B:
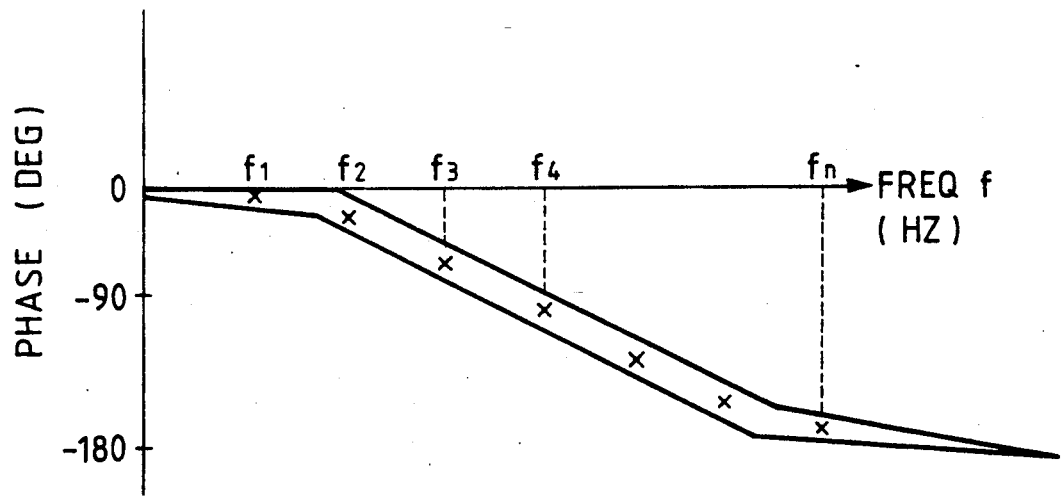
FIG. 6B is a graph showing the tolerance of a phase difference.

(d) When the level A' of the response signal RS approaches a known value with the lapse of time, if A'/A≡$L_0$ where $L_2$<$L_0$<$L_1$, then it is judged that the fiber optic gyro has served its life time.

Where the diagnostic signal DS is an AC signal, it is possible not only to make fault diagnoses similar to those mentioned above but also to check the frequency response characteristic of the fiber optic gyro as described below. In this instance, diagnostic data therefor is prepared using a normally operating fiber optic gyro. That is, diagnostic signals DS of frequencies $f_1, f_2, \ldots f_n$ are sequentially applied to the normal fiber optic gyro to obtain the amplitude ratio K=A'/A and the phase difference $\Delta\phi = 2\pi f \Delta t$ at each frequency between the diagnostic signal DS and the response signal RS, on the basis of which are obtained such frequency-gain and frequency-phase characteristics as shown in FIGS. 6A and 6B. Then, curves which define allowable limits of change, including the sample points, are determined as indicated by the solid lines and are prestored in a memory 26M in the diagnostic decision part 26c shown in FIG. 3. During the diagnostic operation the diagnostic signals DS of the frequencies $f_1, f_2, \ldots f_n$ are sequentially generated by the diagnostic signal generator 27 and the response signal RS at each frequency is provided via the signal extractor 29 to the diagnostic decision part 26c, wherein the amplitude ratio $A'/A$ and the phase difference $\Delta\phi$ are calculated and are checked to see if they are within the allowable limits stored in the memory 26M. When these measured values are outside the limits, it is decided that any one of components in the closed loop of the fiber optic gyro is abnormal.

It is also possible to employ an arrangement in which, for example, the waveform of the output signal RS of the synchronous detector 21, provided in response to the diagnostic signal DS, is prestored, as a pattern corresponding to a fault of each part, in the memory 26M of the diagnostic decision part 26c for comparison with the waveform of the output signal RS of the synchronous detector 21 and in the case of coincidence, the corresponding faulty component is also output as the diagnostic result DRES. The waveforms of the diagnostic signal DS and the output signal RS of the synchronous detector 21 may also be displayed on a display for an operator to diagnose the fiber optic gyro. In such an instance, the displays may be provided in digital form, if the diagnostic signal DS is a DC signal. In the case where an analog AC signal generator is provided in the diagnostic signal generator 27 and an AC diagnostic signal DC is applied therefrom to the integrator 22 in response to an instruction from the diagnostic unit 26, the AC diagnostic signal is converted to a digital signal, which is provided to the diagnostic unit 26 and is used for diagnostic decision. In the case of a relatively simple diagnostic operation and decision, the diagnostic unit 26 may be formed by analog hardware.

In the above, when the diagnostic signal DS is applied to the integrator 22, a ramp signal is produced by the ramp generator 23 in a manner to cancel it. It is also possible, therefore, to adopt an arrangement in which the output of the output circuit 25 is provided to the diagnostic unit 26 for checking whether the output of the fiber optic gyro corresponds to the diagnostic signal and hence deciding whether the fiber optic gyro is normal or not.

Figure 7:
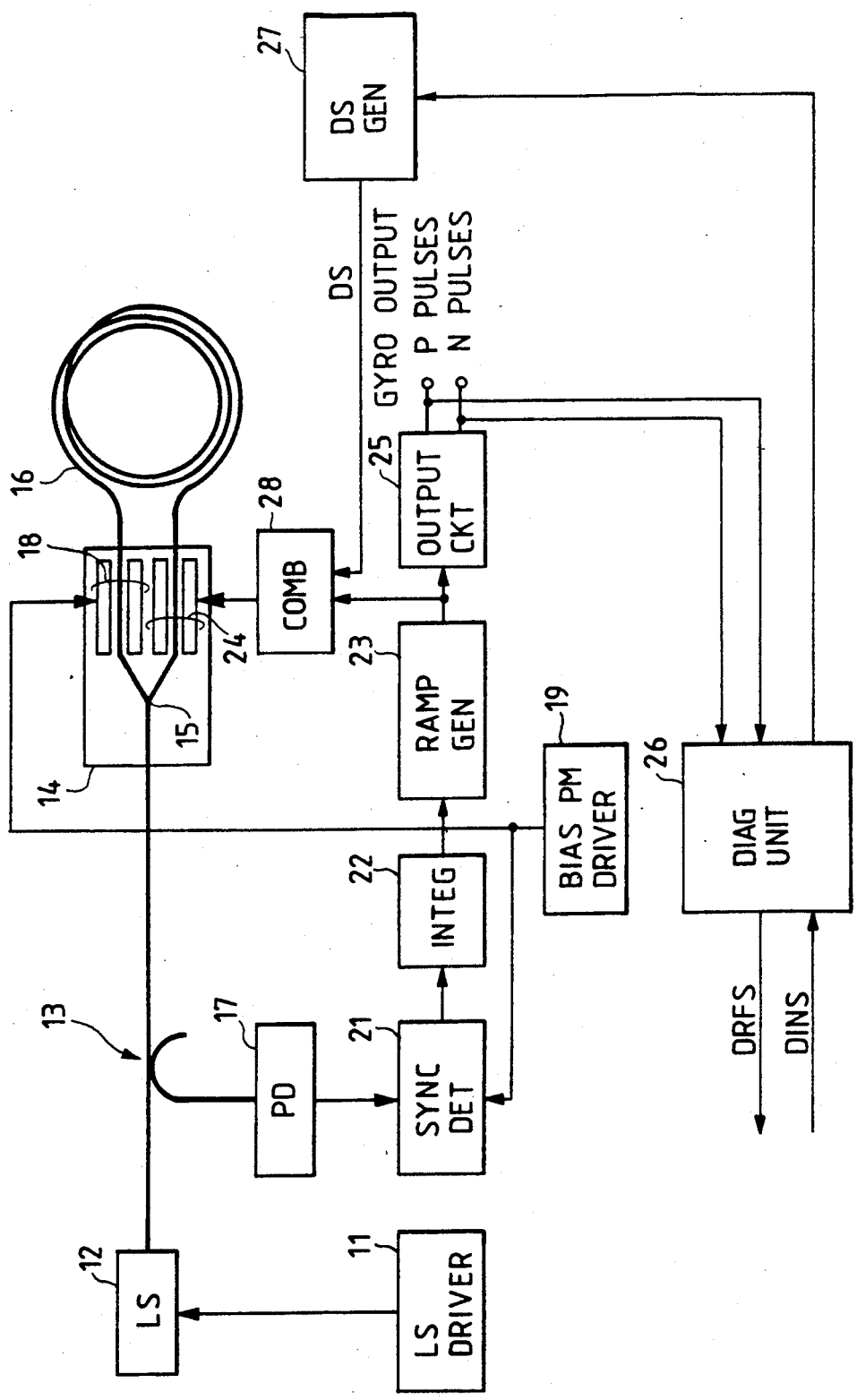
FIG. 7 is a block diagram illustrating a second embodiment of the present invention.

FIG. 7 illustrates in block form a second embodiment of the present invention, in which the parts corresponding to those in FIG. 1 are identified by the same reference numerals. In this embodiment the combiner 28 is provided between the output of the ramp generator 23 and the feedback phase modulator 24 and the diagnostic signal DS is added to the ramp voltage. When supplied with the diagnostic instruction DINS from the outside, the diagnostic unit 26 controls the diagnostic signal generator 27 to generate the diagnostic signal DS of the ramp waveform. A positive or negative ramp wave is selectively generated as the diagnostic signal DS. The diagnostic signal DS thus generated has the same amplitude as that of the output ramp wave signal of the ramp generator 23 and has a preset frequency. This diagnostic signal DS is superimposed on the output of the ramp generator 23. Also in this instance, if the diagnostic signal DS is applied to the feedback phase modulator 24 when the input angular rate is zero, a phase difference is introduced between the right-handed light and the left-handed light emitted from the optical fiber coil 16 as if an angular rate is input, and the ramp generator 23 generates such a ramp wave as if cancels the diagnostic signal DS. In this example, the output of the output circuit 25 at that time is input into the diagnostic unit 26 for deciding whether a correct output corresponding to the diagnostic signal DS can be obtained, and the diagnostic result is provided therefrom and is displayed on a display (not shown). Also in this case, it is possible to use an arrangement in which the output of the synchronous detector 21 is applied to the diagnostic unit 26 to diagnose the fiber optic gyro, depending on whether an output corresponding to the diagnostic signal DS can be obtained or not.

Figure 8:
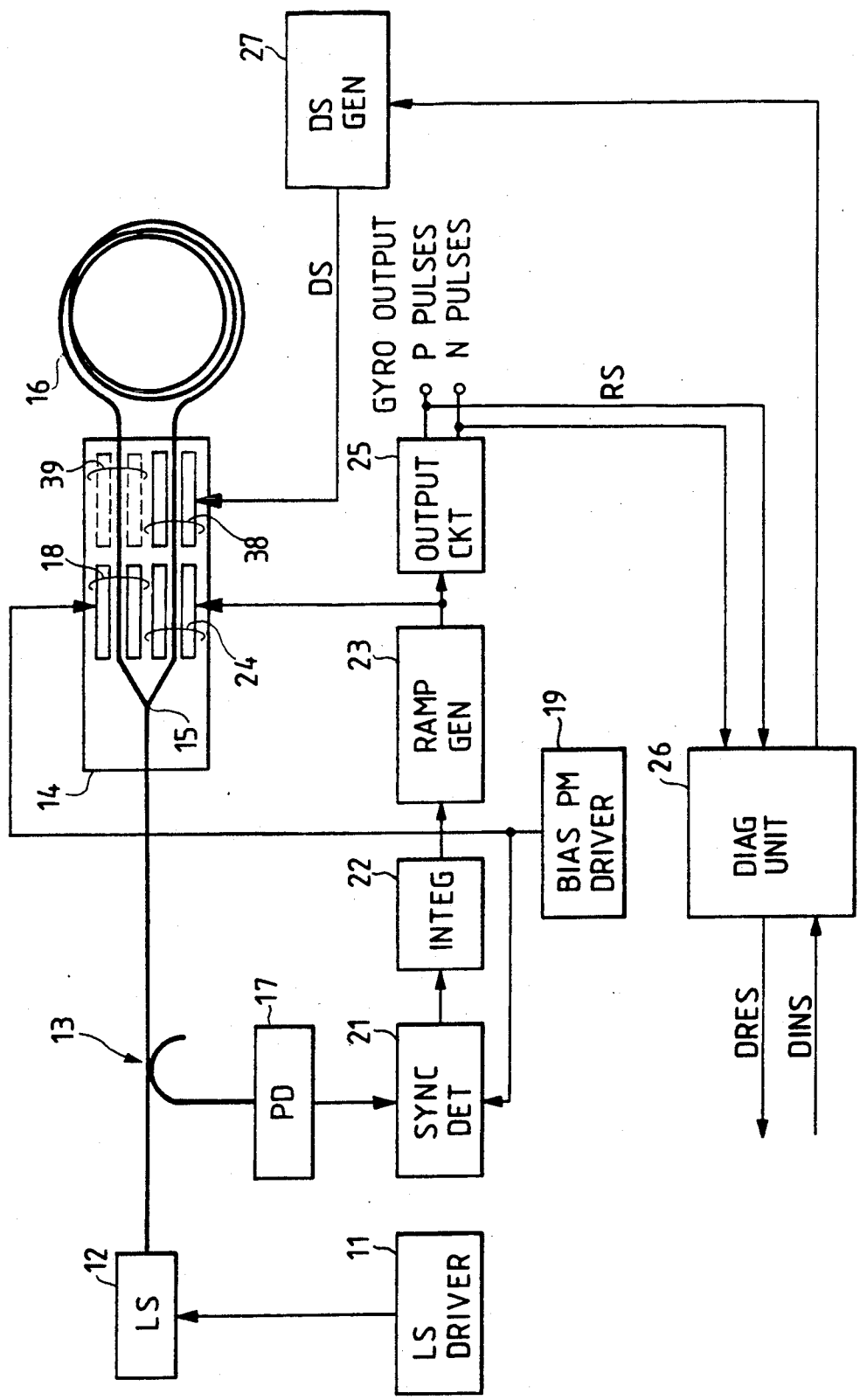
FIG. 8 is a block diagram illustrating a third embodiment of the present invention.

FIG. 8 illustrates in block form a third embodiment of the present invention, in which phase modulating means for diagnostic use is provided and the ramp wave diagnostic signal DS is supplied thereto, although in FIG. 8 the ramp wave diagnostic signal DS is superimposed on the output of the ramp generator 23. For example, as shown in FIG. 8, a phase modulator for diagnostic use 38 is connected in series with the feedback phase modulator 24 in the optical integrated circuit 14 and the ramp wave diagnostic signal DS is applied directly to the phase modulator 38 from the diagnostic signal generator 27. The phase modulator 38 may also be connected in series with the bias phase modulator 18 as indicated by the broken lines 39. The phase modulator for diagnostic use 28 can be considered to be provided for injecting the diagnostic signal DS into the closed loop of the fiber optic gyro as is the case with the combiner 28 in the embodiments of FIGS. 2 and 7.

Figure 9:
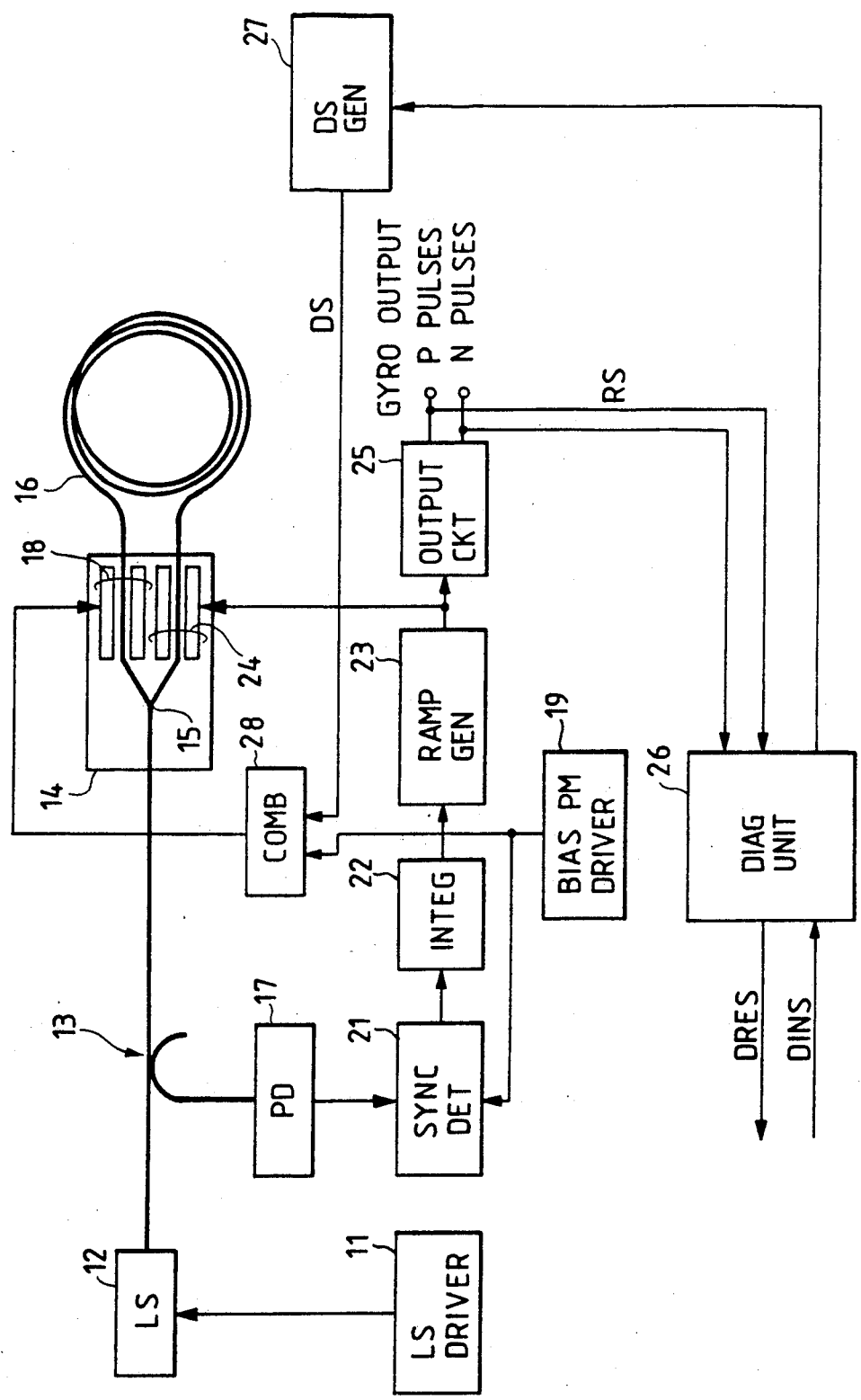
FIG. 9 is a block diagram illustrating a fourth embodiment of the present invention.

FIG. 9 illustrates in block form a fourth embodiment of the present invention, in which the ramp wave diagnostic signal DS from the diagnostic signal generator 27 is applied to the combiner 28, wherein it is superimposed on the bias phase modulating signal from the bias phase modulator driver 19, and the superimposed output is applied to the bias phase modulator 18.

It can easily be understood that the embodiments shown in FIGS. 8 and 9 are also capable of making the same self-diagnosis as is the case with the FIG. 7 embodiment.

As described above, the fiber optic gyro of the present invention has the fault diagnostic function, and hence can be checked to see if it is normal or not, even after it is built in an apparatus, simply by providing a diagnostic instruction without the necessity of physically inputting the angular rate. Accordingly, the present invention is of great utility in practical use.

It will be apparent that many modifications and variations may be effected without departing from the scope of the novel concepts of the present invention.

What is claimed is:

1. A fiber optic gyro with a fault diagnostic function, comprising:
   a light source for emitting a light beam to an optical path;
   an optical fiber coil which makes at least one loop;
   optical splitter/coupler means which splits said light beam from said optical path for incidence to both ends of said optical fiber coil and couples together light beams emitted therefrom after having propagated therethrough as right-handed light and left-handed light and provides the resulting interference light onto said optical path;

feedback phase modulating means connected in series between one end of said optical fiber coil and said optical splitter/coupler means, for providing a phase difference between said right-handed light and said left-handed light;

photoelectric converting means supplied with said interference light from said optical path, for converting its intensity into an electric signal;

phase detecting means for detecting information on said phase difference between said right-handed light and said left-handed light contained in said electric signal from said photoelectric converting means;

ramp wave generating means for generating a ramp wave of a frequency corresponding to the level of the detected signal from said phase detecting means, said ramp wave from said ramp wave generating means being provided to said feedback phase modulating means so that said phase difference between said right-handed light and said left-handed light is reduced to zero to thereby form a closed loop which effect negative control;

diagnostic signal generating means for generating a predetermined diagnostic signal;

signal combining means for combining said diagnostic signal from said diagnostic signal generating means with said closed loop; and diagnostic means which obtains a response signal responsive to said diagnostic signal from said closed loop and makes a fault diagnosis based on said response signal.

2. The fiber optic gyro of claim 1, wherein said signal combining means is connected between said phase detecting means and said ramp wave generating means, for superimposing said diagnostic signal on the output of said phase detecting means.

3. The fiber optic gyro of claim 1, wherein said signal combining means is connected between said ramp wave generating means and said feedback phase modulating means, for superimposing a ramp wave for diagnostic use, as said diagnostic signal, on the output of said ramp wave generating means.

4. The fiber optic gyro of claim 1, wherein said signal combining means is diagnostic phase modulating means connected in series between one end of said optical fiber coil and said optical splitter/coupler means and said diagnostic signal generating means superimposes a ramp wave for diagnostic use, as said diagnostic signal.

5. The fiber optic gyro of claim 1, which further includes bias phase modulating means connected in series between one end of said optical fiber coil and said optical splitter/coupler means and bias signal generating means for applying a bias phase modulating signal to said bias phase modulating means so that said right-handed and said left-handed light propagating through said optical fiber coil are given bias phase alternating every propagation time thereof, and wherein said signal combining means is provided between said bias signal generating means and said bias phase modulating means, for superimposing said diagnostic signal on said bias phase modulating signal.

6. The fiber optic gyro of claim 1, 2, 3, 4, or 5, wherein said response signal from said closed loop is the output of said phase detecting means.

7. The fiber optic gyro of claim 1, 2, 3, 4, or 5, wherein said response signal from said closed loop is the output of said fiber optic gyro corresponding to said ramp wave.

* * * * *